United States Patent [19]

Hermans et al.

[11] 4,210,735

[45] Jul. 1, 1980

[54] PROCESS FOR THE POLYMERIZATION OF α-OLEFINS

[75] Inventors: Jean-Pierre Hermans, Strombeek-Bever; Paul Henrioulle, Marilles, both of Belgium

[73] Assignee: Solvay & Cie, Brussels, Belgium

[21] Appl. No.: 297,087

[22] Filed: Oct. 12, 1972

[30] Foreign Application Priority Data

Nov. 24, 1971 [LU] Luxembourg .......................... 64328

[51] Int. Cl.$^3$ ............................ C08F 4/66; C08F 10.06
[52] U.S. Cl. ................................. 526/119; 252/429 B; 526/139; 526/140; 526/141; 526/142; 526/158; 526/351
[58] Field of Search .................... 260/94.9 B, 94.9 C, 260/94.9 E; 526/139, 140, 141, 142, 158, 119

[56] References Cited

U.S. PATENT DOCUMENTS

| | | | |
|---|---|---|---|
| 3,032,513 | 5/1962 | Tornquist et al. | 260/94.9 E |
| 3,492,281 | 1/1970 | Smith et al. | 526/142 |
| 3,701,763 | 10/1972 | Wada et al. | 260/94.9 E |
| 3,769,233 | 10/1973 | Hermann et al. | 260/94.9 B |

OTHER PUBLICATIONS

Raff et al. Crystallin Olefin Polymer, Part I., Vol. XX, Interscience Pub. N.Y. p. 366 (1965).

*Primary Examiner*—Edward J. Smith
*Attorney, Agent, or Firm*—Spencer & Kaye

[57] ABSTRACT

Process for the polymerization of α-olefins in the presence of an activator selected from among the organic compounds of metals of groups Ia, IIa, IIb and IIIa of the Periodic Table and a solid catalytic element prepared by
 (a) reducing TiCl$_4$ by means of a reducing metal selected from among the metals of groups Ia, IIa, IIb, IIIa of the Periodic Table so as to prepare a double chloride of titanium and the reducing metal
 (b) treating the double chloride thus prepared by means of a complexant
 (c) reacting the double chloride thus treated with TiCl$_4$
 (d) separating the solid catalytic element thus prepared.

15 Claims, No Drawings

PROCESS FOR THE POLYMERIZATION OF α-OLEFINS

The present invention relates to a process for the polymerisation of α-olefins, a process for the preparation of catalytic elements which can be used for this polymerisation and the catalytic elements prepared by this process.

It is known that α-olefins can be polymerised stereo-specifically in the presence of a catalytic system comprising a solid composition of $TiCl_3$ with a metallic halide and an activator consisting of an organic compound of aluminum.

Solid compositions of this type can be prepared by carrying out the reduction of $TiCl_4$ by means of metallic aluminum. The reaction product contains $TiCl_3$ and $AlCl_3$.

These compositions used during the polymerisation of the α-olefins lead to considerable quantities of amorphous polymer.

With a view to improving the stereospecificity of these catalytic systems it has already been proposed that the quantity of aluminum derivatives present in the reduced solid should be reduced. However, as $TiCl_3$ and $AlCl_3$ are isomorphous, they co-crystallise and cannot be separated by classic methods.

The use of complexants has been proposed for this purpose.

Thus in Belgian Pat. No. 610 761 of the Nov. 24, 1961 in the name of Eastman Kodak a process is described for the preparation of $TiCl_3$ in which the reduction of $TiCl_4$ is carried out by aluminum in the presence of a complexant which is capable of forming a complex with the aluminum chloride formed during the reaction. The complex is soluble in the complexant.

In Belgian Pat. No. 655 308 of the Nov. 5, 1964 in the name of Mitsui, a process is described for the preparation of a catalytic composition in which one grinds a composition containing violet $TiCl_3$ in the presence of a small quantity of a mono-ether or a monoketone. The catalytic composition is obtained by the reduction of $TiCl_4$ by metallic aluminum powder in the presence of $AlCl_3$. With these catalytic compositions one obtains polymers whose content of amorphous products is lower but still unacceptable.

On the other hand, if the use of complexants during the preparation of the catalytic element improves slightly the activity of the catalytic systems used hitherto, this still remains low.

The Applicants have now found that it is possible to prepare catalytic elements from $TiCl_3$ obtained by the reduction of $TiCl_4$ by a metal leading to catalytic systems having a very much improved activity and an exceptionally high stereospecificity.

The present invention therefore relates to a process for the polymerisation of α-olefins in which one operates in the presence of an activator selected from among the organic compounds of metals of groups Ia, IIa, IIb and IIIa of the Periodic Table and a solid catalytic element prepared by:

(a) reducing $TiCl_4$ by means of a reducing metal selected from among the metals of Groups Ia, IIa, IIb and IIIa of the Periodic Table so as to prepare a double chloride of titanium and the reducing metal (b) by treating the double chloride thus prepared by means of a complexant (c) by reacting the double chloride thus treated with $TiCl_4$ (d) by separating the solid catalytic element thus prepared.

The invention also relates to the process of preparation of the solid catalytic element and the catalytic element itself.

The reduction of $TiCl_4$ into a double chloride of titanium and the reducing metal is carried out by means of a reducing metal selected from among the metals of Groups Ia, IIa, IIb and IIIa of the Periodic Table. Among these reducing metals one may mention by way of example potassium, sodium, magnesium, zinc, calcium, strontium, barium, aluminum and boron. Preferably magnesium and aluminum are used. The best results are obtained when the reducing metal is aluminum. It is also possible to use an alloy of two or more reducing metals.

The double chloride of titanium and the reducing metal is prepared by bringing the $TiCl_4$ into contact with the finely divided metal reducing agent preferably in the form of a powder and possibly in the presence of a diluent. The reduction of the $TiCl_4$ into $TiCl_3$ is advantageously carried out by forming a suspension at the rate of 1 mole of $TiCl_4$ and 0.1 to 1, preferably 0.2 to 0.5 gram atoms of reducing metal in 0.1 to 30, preferably 2 to 10 moles of diluent and heating the suspension to a temperature between 80° and 300° C. and preferably between 100° and 200° C. It is preferable to heat at reflux temperature. The crystallinity of the double chloride obtained depends on the duration of the heating and the temperature of the reduction. Generally speaking one observes that high temperatures of preparation give high degrees of crystallinity in relatively short periods of time. Although this is not critical, the duration is sufficient for the reaction to be practically total and also so that the conversion of the $TiCl_4$ into the double halide of titanium and the reducing metal is also total. It is generally of the order of 15 minutes to 24 hours, preferably 1 to 6 hours according to the reaction temperature used. The reduction may be catalysed by certain compounds such as $AlCl_3$.

The reducing metal powder may be obtained, for example, by grinding. It is also possible to carry out the reduction in a grinder. The diluents which can be used during the reduction are preferably selected from among the aromatic hydrocarbons, aliphatic and cyclo-aliphatic hydrocarbon diluents and mixtures thereof.

The double chloride of titanium and the reducing metal thus prepared is then separated from its medium of preparation by any known means such as filtration, decantation and centrifuging.

The approximate composition of the double chloride of titanium and the reducing metal thus prepared may be represented by the general formula $nTiCl_3.MCl_x$ in which n is any number so that $0 < n \leq 3$ and preferably so that $$2 \leq n \leq 3$$

M is the reducing metal as defined above
x is the valency of the reducing metal.

The exact nature of this composition may be variable and depends on numerous factors such as, for example, the type of diluent, the temperature and duration of the reduction reaction. It is of no importance as regards the subsequent preparation of the catalytic element.

The catalytic properties of the double chloride of titanium and the reducing metal thus prepared are only of slight interest for the stereospecific polymerisation of α-olefins. The stereospecificity and its activity are mediocre.

According to the invention, the double chloride of titanium and the reducing metal is then treated by means of a complexant selected from among the compounds which are capable of forming complexes with the chloride of the reducing metal.

It is preferable to use organic compounds containing one or more atoms or groups presenting one or more pairs of free electrons which are capable of ensuring the co-ordination with the reducing metal. These compounds contain from 1 to 30 carbon atoms per atom or group which is an electron donor.

Among the atoms which are capable of donating one or more pairs of free electrons, one may mention the atoms of the non-metals of groups V and VI of the Periodic Table, such as for example oxygen, sulphur, nitrogen, phosphorus, antimony and arsenic.

By way of representative examples of compounds containing groups which are capable of donating one or more pairs of electrons, one may mentioned the ethers, the thioethers, the thiols, the phosphines, the stibines, the arsines, the amines, the amides, the ketones and the esters.

Preferably one uses complexants of the general formulae

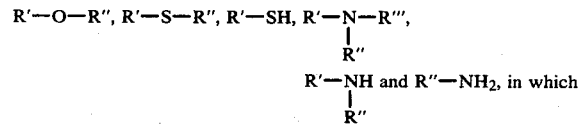

R', R" and R'" are hydrocarbon radicals containing 1 to 15 carbon atoms preferably selected from among the alkyl, aryl, arylalkyl, alkylaryl, cycloalkyl radicals. R', R" and R'" may be the same or different.

The best results are obtained when one uses complexants of the general formula R'—O—R' in which R' is an aliphatic radical containing 2 to 8 carbon atoms and preferably 4 to 6. The treatment of the double chloride of titanium and the reducing metal by means of the complexant is advantageously carried out in the presence of an inert diluent selected from among those usually employed in the polymerisation of olefins and preferably from among the aliphatic and cycloaliphatic hydrocarbons containing 5 to 12 carbon atoms. The diluent usually employed is hexane. It is possible to use this same type of diluent at each stage of the preparation of the catalytic element. The double chloride of titanium and the reducing metal is maintained in suspension by agitation. The quantity of diluent is selected so that the content of double chloride of titanium and reducing metal is between 0.03 and 4 moles of $TiCl_3$ per liter of diluent and preferably between 0.3 and 2 moles of $TiCl_3$ per liter of diluent. The temperature during the treatment must be higher, the lower the concentration of the complexant in the diluent.

The operation is advantageously carried out at a temperature of between 0° and 80° C.

The duration of the treatment is not critical. Preferably one employs a duration of greater than 5 minutes and less than 24 hours.

The quantity of complexant to be used is greater than 0.5 moles and preferably than 1 mole per mole of $TiCl_3$ present in the double chloride of Ti and the reducing metal. The best results are obtained when one uses a quantity of complexant of between 1.2 moles and 5 moles per mole of $TiCl_3$ present in the double halide of Ti and the reducing metal.

If desired the solid thus treated may be separated from the treatment medium by decantation or filtration and be washed with inert diluent.

The treated solid is then brought into contact with $TiCl_4$ so as to form the catalytic element of the present invention.

The reaction of the treated solid with $TiCl_4$ may be carried out by means of pure $TiCl_4$ or else in the presence of an inert diluent.

In the latter case the concentration of $TiCl_4$ is greater than 5% by volume and preferably between 20 and 40%. The reaction of the treated solid with $TiCl_4$ is carried out at a temperature of between −30° and +135° C. and preferably between 20° and 80° C. The best results are obtained when the temperature is between 40° and 70° C.

The duration of the reaction is not critical and is advantageously greater than 5 minutes and less than 24 hours.

During the reaction of the formation of the catalytic element the treated solid is maintained in suspension by means of moderate agitation.

The catalytic elements is separated from its reaction medium by filtration or decantation and is washed by means of diluents so as to eliminate the residual $TiCl_4$ as well as the byproducts of the reaction.

It is also possible to carry out the treatment with the complexant and the reaction with $TiCl_4$ simultaneously. In this case the conditions of operation are identical, mutatis mutandis, with those defined above for the case where the two operations are carried out successively.

The specific surface area of the catalytic elements of the invention is high. It is of the order of 100 sq.m. per gram. The specific surface area of the classic catalytic elements which have not undergone the treatment of the invention is of the order of only 40 sq.m. per gram.

The catalytic elements of the invention are used to polymerise α-olefins and make it possible to obtain highly crystalline polymers. They are used jointly with an activator selected from among the organic compounds of the metals of Groups Ia, IIa, IIb and IIIa of the Periodic Table and preferably from among the organic compounds of aluminum of the formula $AlR_mX_{3-m}$ in which R is a hydrocarbon radical containing from 1 to 18 carbon atoms and preferably 1 to 12 carbon atoms selected from among the alkyl, aryl, arylalkyl, alkylaryl and cycloalkyl radicals; the best results are obtained when R is selected from among the alkyl radicals containing 2 to 6 carbon atoms X is a halogen selected from among fluorine, chlorine, bromine and iodine; the best results are obtained when X is chlorine m is any number such that $0 < m \leq 3$ and preferably such that $1.5 \leq m \leq 2.5$; the best results are obtained when m is equal to 2.

Diethyl aluminum chloride ensures a maximum activity and stereospecificity of the catalytic system.

The catalytic systems thus defined are applied to the polymerisation of olefins with a terminal unsaturation whose molecule contains 2 to 18 and preferably 2 to 6 carbon atoms, such as ethylene, propylene, butene-1, pentene-1, methylbutenes-1 hexene-1, 3-methylpentene-1 and 4-methylpentene-1 and vinyl cyclohexane. They are particularly interesting for the polymerisation of propylene, butene-1 and 4-methylpentene-1 to form crystalline and highly isotactic polymers. They also apply to the co-polymerisation of these α-olefins with one another as well as with diolefins containing 4 to 18 carbon atoms. Preferably the diolefins are unconjugated aliphatic diolefins such as hexadiene-1,4, unconjugated monocyclic diolefins such as 4-vinylcyclohexane, alicyclic diolefins having an endocyclic bridge such as dicyclopentadiene, methylene- and ethylidene-norbornene and conjugated aliphatic diolefins such as butadiene or isoprene.

It also applies to the manufacture of co-polymers known as block co-polymers which are built up from α-olefins and diolefins. These block co-polymers consist of successions of chain segments of variable lengths; each segment consists of a homopolymer of an α-olefin or a statistical co-polymer comprising an α-olefin and at least one co-monomer selected from among the α-olefins and diolefins. The α-olefins and the diolefins are selected from among those mentioned above.

The process of the invention is applied particularly well to the manufacture of homopolymers of propylene and co-polymers containing in all at least 50% by weight of propylene and preferably 75% by weight of propylene.

The polymerisation may be carried out by any known process: in solution or in suspension in a solvent or a hydrocarbon diluent which is preferably selected from among the aliphatic or cycloaliphatic hydrocarbons such as butane, pentane, hexane, heptane, cyclohexane, methylcyclohexane or mixtures thereof. One may also carry out the polymerisation in the monomer or one of the monomers maintained in the liquid state or even in the gaseous phase.

The polymerisation temperature is generally selected between 20° and 200° C. and preferably, when operating in suspension, between 50° and 80° C. The pressure is generally chosen between atmospheric pressure and 50 atmospheres and preferably between 10 and 25 atmospheres. Naturally this pressure depends upon the temperature employed.

The polymerisation may be carried out continuously or discontinuously.

The preparation of the block co-polymers may also be carried out by known processes. It is preferable to use a two-stage process consisting in polymerising an α-olefin, generally propylene, using the method described above for homopolymerisation. Then one polymerises the other α-olefin and/or diolefin, generally ethylene, in the presence of the still active homopolymer chain. This second polymerisation may be carried out after completely or partly removing the unreacted monomer during the course of the first stage.

The organo-metallic compound and the catalytic element may be added separately to the polymerisation medium. It is also possible to bring them into contact at a temperature between −40° and 80° C. for a period which may range up to 2 hours prior to introducing them into the polymerisation reactor.

The total quantity of organo-metallic compound used is not critical; it is generally greater than 0.1 mmoles per liter of diluent, of liquid monomer, or reactor volume, preferably greater than 1 mmole per liter.

The quantity of catalytic element used is determined according to its content of $TiCl_3$. It is generally selected so that the concentration of the polymerisation medium is greater than 0.01 mmole of $TiCl_3$ per liter of diluent, of liquid monomer or reactor volume and preferably greater than 0.2 mmoles per liter.

The ratio of the quantities of organo-metallic compound and catalytic element is also not critical. It is generally selected so that the molar ratio of organo-metallic compound to $TiCl_3$ present in the element is between 0.5 and 10 and preferably between 1 and 8. The best results are obtained when the molar ratio is between 2 and 5.

The molecular weight of the polymers manufactured according to the process of the invention may be regulated by the addition to the polymerisation medium of 1 or more molecular weight controlling agents such as hydrogen, diethyl zinc, the alcohols, the ethers and alkyl halides.

The stereospecificity of the catalytic element of the invention is extremely high. For example, during the homopolymerisation of propylene the proportion of amorphous polypropylene, assessed by measuring the weight of polypropylene soluble in the polymerisation hexane and hexane used for washing in relation to the total polypropylene produced during the course of the polymerisation is less than 7% and is almost always less than 5%. The stereospecificity of the classic double chlorides is distinctly less good: these catalytic elements produce something of the order of 10% of soluble polypropylene under the same conditions. The addition of the complexant to the polymerisation medium does not greatly reduce the content of amorphous fraction of polypropylene and generally gives rise to a fall in activity.

Moreover, the insoluble polymer prepared according to the present invention has an isotacticity and a crystallinity which are exceptionally high. Because of the high stereospecificity of the catalysts used, the process of polymerisation which forms the subject of the invention makes it possible to simplify and even do away with the purification in the amorphous fraction of the polymer formed.

Furthermore the activity of the catalytic elements of the present invention is higher than that of the commercial catalysts. For example, in the homopolymerisation of propylene it is of the order of 450 g of insoluble polypropylene per hour and per g of $TiCl_3$ contained in the catalytic element.

The activity of the classic catalysts is only of the order of 350 g of insoluble polypropylene per hour and per g of $TiCl_3$ contained in the catalytic element.

The use of the complexants according to the invention increases the activity and the stereospecificity of the catalytic elements. The same complexants introduced during the polymerisation increase the stereospecificity but decrease the activity of the double chlorides of titanium and aluminum.

The following examples serve to illustrate the invention and they may in no case be regarded as restrictive. In the examples the symbols used have the following meaning and are expressed in the units set out below.

C/Ti: molar ratio between the quantities of complexant and $TiCl_3$ present in the catalytic element Al/Ti: molar ratio between the quantities of aluminum compound (reducing metal) and $TiCl_3$ present in the catalytic element S: specific surface area of the catalytic element in sq.m./g α: activity expressed conventionally in grams of polymer insoluble in the polymerisation diluent obtained per hour and per gram of $TiCl_3$ contained in the catalytic element % soluble: expresses the weight of polymer soluble in the polymerisation diluent reckoned on the weight of total polymer manufactured during the polymerisation test G: torsion rigidity modulus at 60° of arc and 100° C. (ISO 469 recommended draft) expressed in $kg/cm^2$ MFI: melt fluidity index measured under a load of 2.16 kg at 230° C. and expressed in dg/min (ASTM standard D 1238):

In the examples the double chlorides of titanium and aluminum (reducing metal) are commercial products sold by STAUFFER under the name "STAUFFER AA". These double chlorides comply with the general formula $3\ TiCl_3.AlCl_3$.

EXAMPLE 1

A—Treatment with the complexant 7 g of $3\ TiCl_3.AlCl_3$ are suspended in 40 mls. of hexane and one adds 20 mls. of di-isoamyl ether (EDIA), which corresponds to 2.7 moles of EDIA per mole of $TiCl_3$ and to 390 g of EDIA per liter of diluent.

The suspension is agitated for 1 hour at 40° C. Then the treated solid so obtained is separated from the liquid phase and is washed 5 times with 50 mls. of dry hexane.

The treated solid is then dried by means of nitrogen.

B—Reaction of the treated solid with $TiCl_4$

The treated solid is suspended in 85 mls. of a 40% by volume solution of $TiCl_4$. The suspension is agitated for 2 hours at 65° C. The liquid phase is then eliminated and the catalytic element thus obtained is washed 5 times with 50 mls. of hexane at 25° C.

The catalytic element is separated from the hexane and dried by means of pure dry nitrogen.

C—Characteristics of the catalytic element

The specific surface area of the solid catalytic element was determined by British Standard BS 4359/1 and found to be 101 $m^2/g$.

Its chemical composition is as follows:

$$\text{molar ratio } \frac{AlCl_3}{TiCl_3} = 0.198$$
$$\text{molar ratio } \frac{EDIA}{TiCl_3} = 0.030.$$

D—Polymerisation of propylene 1 liter of pure dry hexane was placed in a dry 5-liter stainless steel autoclave which had been purged several times with nitrogen.

There was then introduced successively 500 mg of $AlEt_2Cl$ (in the form of a 200 g/liter solution in hexane) and 205 mg of catalytic element, viz. 166 mg of $TiCl_3$.

The $AlEt_2Cl/TiCl_3$ molar ratio is then 3.8. The autoclave is heated to 60° C. and brought back to atmospheric pressure by slow de-gassing. Then one produces an absolute pressure of hydrogen of 0.15 $kg/cm^2$ and then one introduces propylene until a total pressure at 60° C. of 10.3 $kg/cm^2$ is reached.

This pressure is maintained constant during the polymerisation by the introduction of gaseous propylene.

After 3 hours the polymerisation is stopped by degassing the propylene and the introduction into the autoclave of 20 mls. of isopropyl alcohol. The contents of the autoclave are poured on to a Büchner funnel, rinsed 3 times with 500 mls. of crude hexane and dried under reduced pressure at 50° C. One recovers 242 g of insoluble polypropylene which corresponds to a catalytic activity of 485 g of diluent-insoluble polypropylene/h.g.$TiCl_3$ and a productivity of 1180 g of polypropylene per g of solid catalytic element.

In the hexane used for polymerisation and for washing the insoluble polypropylene one finds 9 g of soluble polypropylene, which corresponds to 3.6% of hexane-soluble polypropylene reckoned on the total quantity polypropylene produced.

The characteristics of the hexane-insoluble polypropylene fraction are:
G = 960 $kg/cm^2$
MFI = 3.0 dg/min.
PSA = 400 $g/dm^3$

EXAMPLE 2

13 g of $3\ TiCl_3.AlCl_3$ are suspended in 80 mls. of hexane and 20 mls. of EDIA are added. The suspension is agitated for 1 hour at 65° C. The treated solid is then washed with hexane and its reaction with $TiCl_4$ is carried out as in Example 1. The polymerisation test is also carried out as in Example 1.

The composition and the properties of the catalytic element obtained are set out in Table 1.

EXAMPLE 3

10 g of $3\ TiCl_3.AlCl_3$ are suspended in 50 mls. of EDIA. The suspension is agitated for 1 hour at 40° C. The treated solid is then washed with hexane and its reaction with $TiCl_4$ is carried out as in Example 1. The polymerisation test is also carried out as in Example 1.

The composition and the properties of the catalytic element obtained are set out in Table 1.

EXAMPLE 4

10.5 g of $3\ TiCl_3.AlCl_3$ are suspended in a solution consisting of 50 mls. of hexane, 10 mls. of EDIA and 35 mls. of $TiCl_4$. The suspension is agitated for 1 hour at 65° C. The catalytic element is then separated from the solution, washed with hexane and then dried with pure dry nitrogen. The polymerisation test is carried out as in Example 1.

Its composition and its properties are set out in Table 1.

EXAMPLE 5

8.9 g of $3\ TiCl_3.AlCl_3$ are suspended in 50 mls. of hexane and one adds 20 mls. of di.n.butyl ether. The suspension is agitated for 1 hour at ambient temperature.

The treated solid is then washed with hexane and its reaction with $TiCl_4$ is carried out as in Example 1. The polymerisation test is also carried out as in Example 1.

The composition and the properties of the catalytic element obtained are set out in Table 1.

EXAMPLE 6

11.9 g of $3\ TiCl_3.AlCl_3$ are suspended in 70 mls. of hexane and one adds 60 mls. of dibutylamine. The suspension is agitated for 15 minutes at ambient temperature.

The treated solid is then washed with hexane and its reaction with TiCl$_4$ is carried out as in Example 1.

The catalytic element obtained, used in the polymerisation of propylene according to Example 1, gave the following results:

$\alpha = 312$
% soluble = 5
G = 990
MFI = 3.

EXAMPLE 7

10 g of 3 TiCl$_3$. AlCl$_3$ are suspended in 50 mls. hexane and 10 mls. of dibutyl sulphide added. The suspension is agitated for 1 hour at 40° C. Then the treated solid is separated from the liquid phase and washed, then its reaction with TiCl$_4$ is carried out as in Example 1.

The catalytic element obtained, used in the polymerisation of propylene according to Example 1, gave the following results:

$\alpha = 350$
% soluble = 6
G = 960
MFI = 3.3.

Examples 8 to 12 are given for purposes of comparison.

EXAMPLE 8

When carrying out polymerisation in accordance with the mode of operation of Example 1, one used the double chloride of Ti and Al of the formula 3 TiCl$_3$.AlCl$_3$ which had not undergone any treatment. The results are shown in Table 2.

EXAMPLES 9 and 10

In these examples the polymerisation of propylene was carried out using the double chloride of Example 8, but adding to the autoclave respectively 5 and 100 mg EDIA (EDIA/TiCl$_3$ = 0.03 and 0.6).

The results are shown in Table 2.

EXAMPLE 11

40.0 g of 3 TiCl$_3$.AlCl$_3$ are suspended in 240 mls. of hexane and 36.0 mls. EDIA are added. The suspension is agitated for 60 minutes at 35° C. and then the treated solid is separated from the liquid phase, washed 5 times with 250 mls. of hexane and dried by means of pure dry nitrogen.

The analysis of the product obtained is as follows:

$$\frac{Al}{Ti} = 0.3 \text{ and } \frac{EDIA}{Ti} = 0.043.$$

The results obtained when using this solid as catalytic element in the polymerisation according to Example 1 are shown in Table 2.

EXAMPLE 12

8 g of 3 TiCl$_3$.AlCl$_3$ are suspended in 85 mls. of a hexane/TiCl$_4$ solution containing 40% by volume of TiCl$_4$. The suspension is agitated for 2 hours at 65° C.

The violet solid obtained is separated from the liquid phase, washed 5 times with 50 mls. of hexane and dried by means of pure dry nitrogen.

The results obtained when this solid is used as catalytic element in the polymerisation according to Example 1 are shown in Table 2.

Examples 8 to 12 show that only the catalytic elements according to the invention lead to catalytic systems of very high stereospecificity and improved activity.

TABLE 1

| Example No. | S | Al/Ti | C/Ti | α | G | MFI | % soluble |
|---|---|---|---|---|---|---|---|
| 1 | 101 | 0.198 | 0.030 | 485 | 960 | 3 | 3.6 |
| 2 | 92 | 0.205 | 0.014 | 437 | 958 | 2.7 | 4.4 |
| 3 | 102 | 0.3 | 0.024 | 413 | 990 | 4.0 | 3.9 |
| 4 | 87 | 0.188 | 0.030 | 680 | 962 | 3.2 | 4.7 |
| 5 | 90 | 0.173 | 0.024 | 403 | 1027 | 4.1 | 5.2 |

TABLE 2

| Example No. | S | α | G | MFI | % soluble |
|---|---|---|---|---|---|
| 8 | 41 | 310 | 931 | 3.6 | 10 |
| 9 | 41 | 352 | 905 | 7.5 | 9 |
| 10 | 41 | 410 | 734 | 3 | 33.4 |
| 11 | 40 | 402 | 923 | 3.8 | 10 |
| 12 | — | 260 | 890 | 2.5 | 9 |

We claim:

1. Process for the polymerisation of α-olefins, comprising polymerizing the α-olefin in the presence of an organometallic activator selected from the group consisting of compounds of a metal of one of Groups Ia, IIa, IIb, and IIIa of the Periodic Table and a solid catalytic element prepared by:
    (a) reducing TiCl$_4$ by a reducing metal selected from the group consisting of the metals of Groups Ia, IIa, IIb, and IIIa of the Periodic Table, so as to prepare a double chloride of titanium and the reducing metal which corresponds to the general formula n-TiCl$_3$.MCl$_x$ in which:
    n is any number such that $0 < n \leq 3$;
    M is the reducing metal; and
    x is the valency of the reducing metal,
    (b) treating the double chloride thus prepared of said general formula with a complexant which is capable of insuring coordination with the reducing metal and is of the general formula R'—O—R', wherein R' is an aliphatic radical containing 2 to 8 carbon atoms,
    (c) reacting the double chloride thus treated with TiCl$_4$ to prepare a solid catalytic element, and
    (d) separating the solid catalytic element thus prepared from its reaction medium.

2. Process in accordance with claim 1, wherein the reducing metal is selected from the group consisting of aluminum and magnesium.

3. Process in accordance with claim 2, wherein the reducing metal is aluminum.

4. Process in accordance with claim 1, wherein the double chloride of titanium and the reducing metal corresponds to the formula 3 TiCl$_3$.AlCl$_3$.

5. Process in accordance with claim 1, wherein the complexant is selected from the group consisting of the compounds of the general formula R'—O—R', in which R' is an aliphatic radical containing 4 to 6 carbon atoms.

6. Process in accordance with claim 1, wherein the activator is chosen from the group consisting of the compounds of the general formula AlR$_m$X$_{3-m}$ in which R is a hydrocarbon radical containing 1 to 18 carbon atoms,
X is a halogen and
m is any number such that $0 < m \leq 3$.

7. Process in accordance with claim 1, wherein the activator is diethyl aluminum chloride.

8. Process in accordance with claim 1, wherein α-olefins containing 2 to 18 carbon atoms are polymerised.

9. Process in accordance with claim 1, wherein propylene is polymerised.

10. The process according to claim 1 wherein the quantity of complexant is greater than 0.5 moles per mole of $TiCl_3$.

11. The process according to claim 1 wherein the quantity of complexant is from 1.2 moles to 5 moles per mole of $TiCl_3$.

12. Process in accordance with claim 1, wherein step (b) is carried out in the presence of an inert diluent selected from the group consisting of aliphatic and cycloaliphatic hydrocarbons containing 5 to 12 carbon atoms.

13. Process in accordance with claim 12, wherein the diluent is hexane.

14. Process according to claim 1, wherein steps (a), (b) and (c) are carried out in the presence of an inert diluent selected from the group consisting of aliphatic and cycloaliphatic hydrocarbons containing 5 to 12 carbon atoms.

15. Process according to claim 1, wherein the α-olefin is a monoolefin.

* * * * *